INVENTORS
VICTOR J. TURK
CHARLES H. JUNGE
GEORGE R. KINGSBURY

3,553,806
BEARING AND METHOD OF MAKING SAME
Victor J. Turk, Euclid, and Charles H. Junge and George R. Kingsbury, Cleveland, Ohio, assignors to Clevite Corporation, a corporation of Ohio
Filed Jan. 4, 1968, Ser. No. 695,720
Int. Cl. B21d 53/10
U.S. Cl. 29—149.5    4 Claims

ABSTRACT OF THE DISCLOSURE

This disclosure pertains to the method of making a steel-backed sleeve bearing strip wherein copper-tin powder is sintered on the strip and is infiltrated with lead-tin babbitt at a carefully controlled relatively low temperature, which temperature is quickly reduced after infiltration to minimize migration of tin from the babbitt to the copper.

---

Figure 2:

Automobile bearings often comprise a hard metal backing member, for example, steel, to which is adhered a layer of a bearing material such as babbitt, leaded bronze, copper-lead, or the like. These bearings must be capable of withstanding high-loading, high-operating speeds, dirty operating conditions, etc., and be able to operate under corrosive oil conditions. Furthermore, such bearings must provide a low coefficient of friction to the rotating surface, such as to cause minimum crankshaft scoring. In addition, such bearings should be inexpensive to manufacture.

Bearing materials as disclosed in Pats. Nos. 2,902,748 and 3,004,333, assigned to the same assignee as the present invention, are typical of those available for present-day applications. Such materials have proven satisfactory in the past and are presently utilized to a great extent.

At the present time car manufacturers are greatly extending the recommended mileage between oil changes, and this has made it desirable to provide increased corrosion resistance as an inherent property of the bearing material. The longer oil change periods presently being recommended by car manufacturers results in the formation of a higher level of damaging corrosive acids in the crankcase lubricant.

Applicants have developed a bearing material and process for making same which satisfies present-day increased corrosion resistance requirements.

The composition of the porous copper and bronze sintered layer of the subject material is similar to that disclosed in Pats. Nos. 2,902,748 and 3,004,333. However, the distinguishing characteristic of the bearing of this invention is a considerably higher tin content remaining in the cast babbitt used to infiltrate the porous bronze sintered layer. The additional tin confers corrosion-resisting properties to the lead-base babbitt when it is cast under conditions which preferentially retain more of the tin within the lead phase of the babbitt than has heretofore been possible.

By the disclosed process, maximum corrosion benefits are obtained without harming or reducing the effectiveness of the bearing surface action against a hard crankshaft journal surface.

Applicants have discovered that by closely controlling the babbitt casting temperature, the sintered strip temperature, and the time-at-temperature, a bearing material is provided with increased corrosion resistance over a longer period of time.

Accordingly, it is a principal object of the present invention to provide an improved bearing material and method of making same which has increased corrosion resistance to an outstanding extent, without sacrificing the surface properties and load-carrying capacity of the bearing.

It is a still further object of this invention to provide a closely controlled, continuous process for making a bearing material which has increased corrosion resistance over a longer period of time, especially in "dirty" engine oil.

In accordance with the invention, there is provided a method of producing a strip of bearing material wherein a strip of steel is provided upon one face with a layer of mixed, powdered metal comprised of a copper and tin, or copper and bronze. The amount of tin in said copper-tin or copper-bronze being such that the layer has an overall tin content from about 1.0 to about 2.0%. This layer is then sintered at a temperature around 1880° F. in a reducing atmosphere onto the strip of steel in order to establish a porous sintered layer thereon. The strip of metal and the sintered layer are then cooled to a temperature between 600 and 750° F. while still in a reducing atmosphere. Babbitt (lead-base white metal having a given tin content) is then cast in a reducing atmosphere at a temperature between 600 and 650° F. onto the sintered layer, to cause the molten babbitt to infiltrate the sintered layer and form a composite strip. The sintered layer, after filling by the babbitt, should contain between 5.0 and 6.5% tin. The composite strip is then quickly cooled so that the babbitt solidifies and adheres with the sintered layer to the strip of metal. The low babbitt temperature, the low strip temperature and the quick cooling prevent the formation of large amounts of a hard reaction product between the copper and the tin. Preferably, the reaction layer should not be over about .0002" in thickness. The cast and sintered layers may then be worked to expose part of the sintered layer and reduce the total thickness of the sintered and cast bearing layers, and an overlay plate may be added. The important factors restricting the migration of the tin from the infiltrant to the sintered material with the formation of an undesirable reaction layer are the relatively low temperatures of the sintered layer and the infiltrant during casting, and the short time-at-temperature.

For a better understanding of the present invention, together with other and further objects thereof, reference is had to the following description taken in connection with the accompanying drawings, and its scope will be pointed out in the appended claims.

Figure 3:
Figure 1:
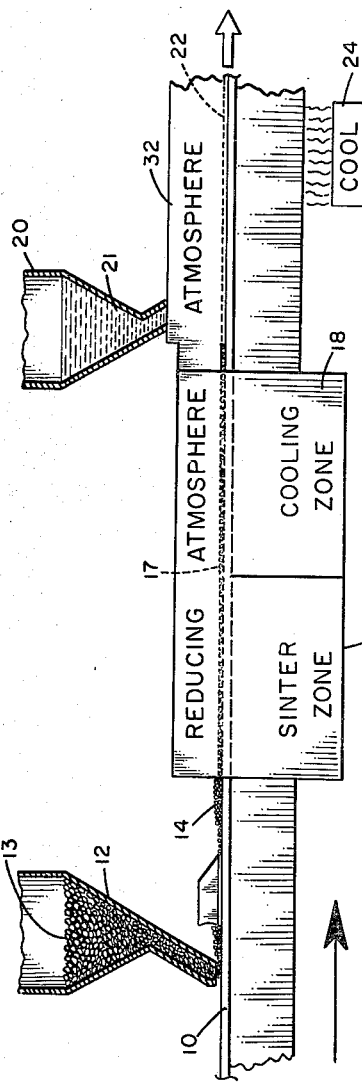

In the drawings:

FIG. 1 is a schematic diagram showing the process of the present invention;

FIG. 2 is a metallographic representation of prior art bearing material with a relatively thick copper-tin reaction layer; his figure is shown at a magnification of 500 diameters at a section through the bearing; and FIG. 3 is a metallographic representation of a bearing material made in accordance with the present invention, with a relatively thin copper-tin reaction layer developed as a result of a controlled time and temperature process; this figure is shown at a magnification of 500 diameters at a section through the bearing.

With reference to FIG. 1, there is shown a schematic representation of the apparatus used to make the composite strip from which may be made a sleeve bearing for automotive use. A steel strip 10 is provided, and is moved from left to right as shown by the arrow. A hopper 12 is provided containing mixed, powdered metal 13 comprising copper and tin or copper and copper-tin alloy with the amount of tin in said mixture being between 1 and 2%. The powder mixture 13 preferably is 80% pure copper and 20% bronze powder, with the bronze powder comprised of 90 to 95% copper and 5 to 10% tin. This mixture 13 is spread upon the top face of the steel strip 10, forming a layer 14 thereon. Subsequently the layer 14 is sintered in a reducing atmosphere within a sintering chamber 16. This is accomplished by bringing both the strip of metal 10 and the layer of powdered material 14 thereon to a temperature of about 1880° F. as is known in the art. Following this, the strip and its sintered layer 17 are cooled in a suitable apparatus 18 to a temperature of between 600 and 750° F. A pouring pot 20 is provided for casting lead-base, tin-containing babbitt 21 with a reducing atmosphere and at a temperature between 600 and 650° F., onto the sintered layer 17 in order to cause the molten babbitt to penetrate or infiltrate the sintered porous layer and form a composite strip 22. The composite strip 22 should have between 5.0 and 6.5% tin in the infiltrated sintered portion thereof. To achieve this, the babbitt should have 6 to 10% tin content. The composite strip 22 is then quickly cooled by an appropriate apparatus 24, such as a water spray, to cause the babbitt to solidify to form, together with the sintered layer, a dense, nonporous layer, tenaciously bonded to the steel strip 10. The time-at-temperature during the casting operation should be such that a hard copper-tin reaction layer which is formed between the copper of the sintered layer and the tin of the babbitt is not greater in thickness than about .0002". This hard reaction layer is very undesirable and is kept to a miinmum by this process. It is formed due to the migration of the corrosion-protective tin from the babbitt to the copper of the sintered layer, and it is disadvantageous in two respects: (1) the hard intermetallic copper-tin layer is a poor bearing material, and (2) the copper robs the babbitt of the tin which is necessary to combat corrosion. Experiments have shown that the babbitt in the sintered layer should not remain in the molten state for more than 15 seconds, otherwise, even at the lowest strip and pouring temperatures excessive amounts of the copper-tin intermetallics may be formed. The infiltrated sintered layer should have between 5.0 and 6.5% tin content.

Following the sintering and casting operations, the strip may be worked by conventional manufacturing methods in order to expose part of the sintered material by reducing the total thickness of the sintered and cast bearing layers, and an overlay plate may be added.

In the alternative, following the casting of the babbitt 21 upon the sintered layer 17, the composite strip 22 is wiped by a suitable wiping apparatus 32 in order to remove excess liquid babbitt and substantially expose the top surface of the composite layer. Following this, the wiper composite strip 22 is quenched, as by a water spray device 24. After this, the steel-backed composite strip is machined and further processed. The babbitt infiltrant used within the teaching of this process preferably contains approximately 6 to 10% tin. If the sintered matrix is infiltrated with a lead-base babbit having greater than about 10% tin, there is a further slight improvement in corrosion resistance; however, an attendant degradation of surface behavior results due to formation of an excessive amount of the hard, brittle, copper-tin compounds. A sintered grid infiltrated with a lead-base babbitt having less than about 6% tin has been found to provide insufficient resistance to corrosion over long periods of time in "dirty" oil. The sintered layer, after infiltration, should have between 5 and 6.5% tin, and a minimum quantity of the tin should be in the form of hard copper-tin reaction material.

An important aspect of the invention lies in the temperature control of the sintered strip and of the babbitt during the babbitt casting operation, together with control of the length of time that the infiltrated babbitt is in its liquid state. By properly controlling these factors most of the tin within the babbitt is successfully retained within the lead phase thereof, which substantially improves the corrosion behavior of a bearing made from this material and results in a copper-tin reaction layer of insufficient magnitude to cause seizure and scoring of the crankshaft material.

FIG. 2 shows a bearing material wherein the temperatures of the sintered strip and of the babbitt, and the time-at-temperature were not carefully controlled to produce minimum migration of the tin in the babbitt to the copper. It has resulted in an undesirable thick layer 30 of brittle intermetallic material around the copper-tin-matrix material 28, and it results in deficient tin content in the babbitt 26.

In contrast, FIG. 3 shows the bearing material made in accordance with the process herein described, resulting in a copper-tin reaction layer 30 which is only about .0001" thick, with a consequent increase in the amount of tin remaining in the babbitt 26.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

We claim:
1. The method of making a strip of bearing material comprising:
   providing a strip of steel;
   spreading on one face of said strip a layer of mixed, powdered metal comprising, at least in part, copper-tin alloy and the remainder copper, the amount of tin in said mixture being such that said layer has about 1.0 to 2.0% tin;
   sintering in a reducing atmosphere said layer of powdered metal onto said strip of metal to form a sintered porous layer thereon by bringing said strip of metal and said sintered layer to a temperature of about 1880° F.;
   cooling said strip and said sintered layer in a first cooling zone to a temperature of about 600 to 750° F. in a reducing atmosphere;
   casting molten lead base babbitt containing tin in a reducing atmosphere at a casting temperature between 600 and 650° F. onto said sintered layer to cause the molten babbitt to infiltrate said sintered layer and form a composite strip, said sintered layer after filling by said babbitt having between 5 and 6.5% tin;
   quickly cooling said composite strip in a second cooling zone whereby said babbitt hardens to tenaciously adhere with said sintered layer to said strip; said strip being maintained in a reducing atmosphere at all times from the sintering zone through the first cooling zone through the casting step and to the second cooling zone;
   the casting temperature and the time-at-temperature prior to quickly cooling the composite strip being such that a hard copper-tin reaction product layer which forms between the sintered layer and the cast babbitt is not greater in thickness than about .0002".

2. The method of making a strip of bearing material as set forth in claim 1, further characterized by said babbitt during the casting step having a tin content between about 6% and 10%.

3. The method of making a strip of bearing material as set forth in claim 2, further characterized by cooling said infiltrated sintered layer to a temperature where the molten babbitt solidifies in a time period not to exceed about fifteen seconds after pouring.

4. A strip of bearing material made in accordance with the method set forth in claim 1, and characterized by the hard copper-tin reaction layer between the copper of the sintered layer and the babbitt being not greater in thickness than about .0002".

References Cited

UNITED STATES PATENTS

| | | | |
|---|---|---|---|
| 2,585,430 | 2/1952 | Boegehold | 29—149.5X |
| 2,902,748 | 9/1959 | Schaefer | 29—149.5 |
| 2,986,464 | 5/1961 | Lewis et al. | 75—208 |
| 3,004,333 | 10/1961 | Schaefer | 29—191.2 |

JOHN F. CAMPBELL, Primary Examiner

D. C. REILEY, Assistant Examiner

U.S. Cl. X.R.

29—191.2, 527.5, 530; 75—208